United States Patent
Zheng et al.

(10) Patent No.: US 8,762,761 B2
(45) Date of Patent: Jun. 24, 2014

(54) ENGINE LEVEL POWER GATING ARBITRATION TECHNIQUES

(75) Inventors: Zheng Yu Zheng, Austin, TX (US); Oren Rubinstein, Sunnyvale, CA (US); Yudong Tan, San Jose, CA (US); Saket Arun Jamkar, Santa Clara, CA (US); Yogesh Kulkarni, Sunnyvale, CA (US)

(73) Assignee: Nvidia Corporation, Santa Clara, CA (US)

( * ) Notice: Subject to any disclaimer, the term of this patent is extended or adjusted under 35 U.S.C. 154(b) by 607 days.

(21) Appl. No.: 12/965,154

(22) Filed: Dec. 10, 2010

(65) Prior Publication Data
US 2012/0146706 A1    Jun. 14, 2012

(51) Int. Cl.
*G06F 1/24* (2006.01)
*G06F 1/26* (2006.01)
*G06F 1/32* (2006.01)
*H03K 17/00* (2006.01)
*H03K 17/20* (2006.01)

(52) U.S. Cl.
USPC .............. 713/330; 713/1; 713/300; 713/310; 713/320; 713/321; 713/322; 713/323; 713/324; 327/365; 327/376; 327/377

(58) Field of Classification Search
None
See application file for complete search history.

(56) References Cited

U.S. PATENT DOCUMENTS

| | | | |
|---|---|---|---|
| 2004/0123172 A1* | 6/2004 | Sheller | 713/323 |
| 2004/0215779 A1* | 10/2004 | Weber | 709/226 |
| 2009/0072885 A1* | 3/2009 | Kawasaki | 327/519 |
| 2010/0216524 A1* | 8/2010 | Thomas et al. | 455/574 |
| 2011/0264946 A1* | 10/2011 | Goodemote et al. | 713/501 |
| 2011/0283130 A1* | 11/2011 | Pai et al. | 713/330 |
| 2012/0102344 A1* | 4/2012 | Kocev et al. | 713/322 |

* cited by examiner

*Primary Examiner* — Fahmida Rahman

(57) ABSTRACT

An integrated circuit, in accordance with embodiments of the present technology, includes a plurality of engines, a plurality of engine level power gating (ELPG) controllers, and a power gating arbiter for implementing engine level power gating arbitration techniques. The power gating arbiter may receive requests from one or more ELPG controllers to turn on their respective engines or portions therein. The power gating arbiter prioritizes the request and sends an acknowledgment to a given ELPG controller to turn on or off its corresponding engine according to the prioritized predetermined order. After receiving the acknowledgement, the given ELPG controller turns on or off its corresponding engine and returns an indication to the power gating arbiter that the corresponding engine is turned on or off. The process may be iteratively repeated for each received request after receiving the indication from the previously serviced ELPG controller that its corresponding engine is turned on or off.

16 Claims, 10 Drawing Sheets

ENGINE LEVEL POWER GATING ARBITRATION TECHNIQUES

BACKGROUND OF THE INVENTION

The integrated circuit is an electronic circuit that has been manufactured on a monolithic substrate material. The integrated circuit is also typically referred to as a monolithic IC, microchip, microcircuit, or chip. The integrated circuit may have hundreds of millions of circuit elements, such as transistors, resistors, capacitors, and the like. The electronic circuits implemented in monolithic integrated circuits may be analog, digital or mixes signal circuits. Integrated circuits may include microprocessors (e.g., CPU, GPU, DSP, microcontroller), memory chips (e.g., RAM, ROM, Flash), application specific integrated circuits (ASIC), field programmable gate arrays (FPGAs), microelectromechanical systems (MEMS), and many more electronic circuits.

As the semiconductor fabrication arts continue to progress, the scale of the circuit elements in integrated circuits tends to continue to decrease, allowing more circuits to be implemented on an integrated circuit substrate. However, as the scale of the circuit elements decreases, the power consumption of the integrated circuits tends to increase. In addition, the leakage current of various circuit elements tends to increase and therefore the power consumed by the circuits also tends increase even if one or more circuits within the integrated circuit are not currently operating.

In the conventional art, one or more circuits within the integrated circuit may be selectively turned off when the particular circuit is idle to conserve power. However, such sleep and/or standby mode techniques may cause large switching current surges. The large switching current surges may cause switching current induced noise in one or more other circuits in the integrated circuit, may cause a drop in one or more supply potentials within the integrated circuit causing logic level errors in one or more other circuits in the integrated circuit, may cause localized heating that may damage the integrated circuit, and/or the like. Accordingly, there is a continued need for improved sleep and/or standby mode techniques.

SUMMARY OF THE INVENTION

Embodiments of the present technology are directed toward engine level power gating arbitration techniques. In one embodiment, a power gating arbiter of an integrated circuit receives requests to turn on or off a corresponding engine from each of one or more engine level power gating (ELPG) controllers of the integrated circuit. The power gating arbiter sequences the received requests from the one or more ELPG controllers for servicing in a predetermined order.

In one embodiment, sequencing the received requests may include prioritizing, by the power gating arbiter, the received request from the one or more ELPG controllers. An indication is sent from the power gating arbiter to a given ELPG controller to switch the power state of its corresponding engine according to the prioritizing. After the ELPG controller completes switching the power state of its corresponding engine, the power gating arbiter receives an indication from the given ELPG controller that its engine's power state has changed. The process of prioritizing the received requests, sending the indication to switch the power state of the corresponding engine, and receiving the indication that the power state of the corresponding engine has changed, is iteratively performed for each request after the indication from the previously serviced ELPG controller, that the power state of its corresponding engine has been changed, has been received.

In another embodiment, an integrated circuit includes a first plurality of engines, a second plurality of ELPG controllers, and a power gating arbiter. Each ELPG controller dynamically controls switching on and off the power of a corresponding engine. The power gating arbiter dynamically sequences control of power switching by the plurality of ELPG controllers.

In one embodiment, a given ELPG controller drives its respective request signal to a first state to request to turn on or off its corresponding engine. The power gating arbiter then drives a respective acknowledgement signal to a first state, in response to the request, to cause the given ELPG controller to turn on or off its corresponding engine according to a predetermined power control sequence for the plurality of engines. After the given ELPG controller's corresponding engine is turned on or off, the given ELPG controller drives its respective request signal from the first state to a second state.

BRIEF DESCRIPTION OF THE DRAWINGS

Embodiments of the present technology are illustrated by way of example and not by way of limitation, in the figures of the accompanying drawings and in which like reference numerals refer to similar elements and in which.

DETAILED DESCRIPTION OF THE INVENTION

Figure 1:
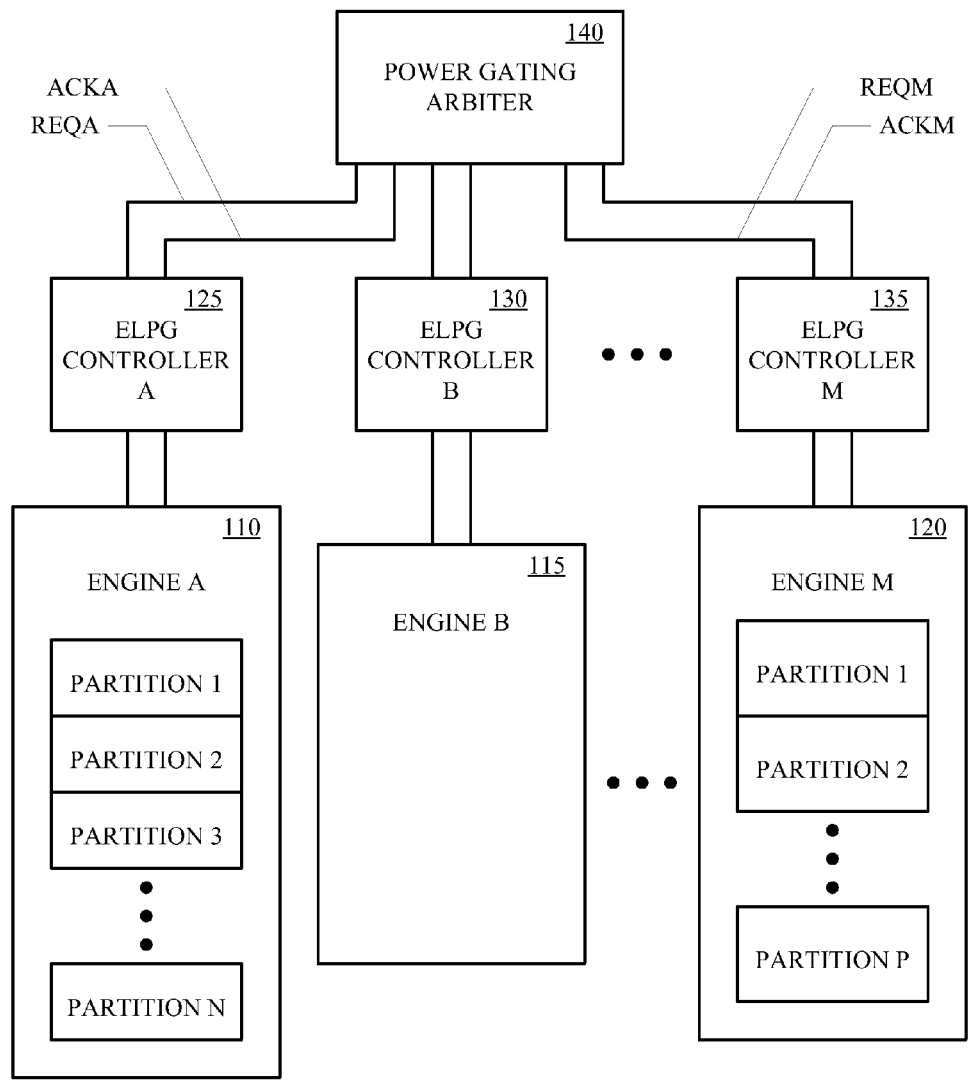
FIG. 1 shows a block diagram of an integrated circuit power gating system, in accordance with one embodiment of the present technology.

Reference will now be made in detail to the embodiments of the present technology, examples of which are illustrated in the accompanying drawings. While the present technology will be described in conjunction with these embodiments, it will be understood that they are not intended to limit the invention to these embodiments. On the contrary, the invention is intended to cover alternatives, modifications and equivalents, which may be included within the scope of the invention as defined by the appended claims. Furthermore, in the following detailed description of the present technology, numerous specific details are set forth in order to provide a thorough understanding of the present technology. However, it is understood that the present technology may be practiced without these specific details. In other instances, well-known methods, procedures, components, and circuits have not been described in detail as not to unnecessarily obscure aspects of the present technology.

Some embodiments of the present technology which follow are presented in terms of routines, modules, logic blocks, and other symbolic representations of operations on data within one or more electronic devices. The descriptions and representations are the means used by those skilled in the art to most effectively convey the substance of their work to others skilled in the art. A routine, module, logic block and/or the like, is herein, and generally, conceived to be a self-consistent sequence of processes or instructions leading to a desired result. The processes are those including physical manipulations of physical quantities. Usually, though not necessarily, these physical manipulations take the form of electric or magnetic signals capable of being stored, transferred, compared and otherwise manipulated in a electronic device. For reasons of convenience, and with reference to common usage, these signals may also be referred to as data, bits, values, elements, symbols, characters, terms, numbers, strings, and/or the like with reference to embodiments of the present technology.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussion, it is understood that through discussions of the present technology, discussions utilizing the terms such as "receiving," and/or the like, refer to the action and processes of an electronic device such as an electronic computing device that manipulates and transforms data. The data are represented as physical (e.g., electronic) quantities within the electronic device's logic circuits, registers, memories and/or the like, and is transformed into other data similarly represented as physical quantities within the electronic device.

In this application, the use of the disjunctive is intended to include the conjunctive. The use of definite or indefinite articles is not intended to indicate cardinality. In particular, a reference to "the" object or "a" object is intended to denote also one of a possible plurality of such objects.

Referring to FIG. 1, an integrated circuit power gating system, in accordance with one embodiment of the present technology, is shown. The integrated circuit is an electronic circuit that has been manufactured on a monolithic substrate material and includes a plurality of engines 110, 115, 120, a plurality of engine level power gating (ELPG) controllers 125, 130, 135, and a power gating arbiter 140. Each ELPG controller 125, 130, 135 may be communicatively coupled to a respective engine 110, 115, 120 of the integrated circuit. In one implementation, each ELPG controller 125, 130, 135 may be communicatively coupled to a respective engine 110, 115, 120 by one or more power switch signal lines, one or more output clamp signal lines, one or more clock switch signal lines, and/or the like. The ELPG controllers 125, 130, 135, may be communicatively coupled to the power gating arbiter 140. In one implementation, each ELPG controller 125, 130, 135 may be communicatively coupled to the power gating arbiter 140 by a request signal line, an acknowledgement signal line, a busy signal line, and/or the like.

The engines 110, 115, 120 may include various functional blocks of an integrated circuit. For example, a graphics processing unit (GPU) may include one or more 2D engines, one or more 3D engines, one or more memory controllers, one or more audio engines, one or more display engines, and/or the like. One or more of the engines 110, 115, 120 may include one or more partitions, one or more zones, and/or the like. For example, a first engine 110 may include N partitions, a second engine 115 may not include any partitions, and a third engine 120 may include P partitions. The size of the engines, partitions, zones and/or the like may vary from one engine, partition, and/or zone to another.

The ELPG controllers 125, 130, 135 each support dynamic control of the corresponding engine 110, 115, 120 or portions therein, which may be driven by user application requests and idle threshold determinations. Each ELPG controller 125, 130, 135 is used to reduce power consumption on the chip by switching on and off its respective engine and/or one or more portions therein. The engine and/or one or more portions therein may be switched off when the engine and/or one or more portions therein are in an idle state. The ELPG controllers 125, 130, 135 also turn their corresponding engine 110, 115, 120 and/or one or more portions therein back on when the function of the engine 110, 115, 120 and/or one or more respective portions therein is called by an application. To prevent a large switching current surge, the one or more portions within an engine 110, 115, 120 may be switched on or off in a configurable sequence by the respective ELPG controller 125, 130, 135. In addition, the power gating arbiter 140 also controls the switching on or off the one or more engines 110, 115, 120 in a predetermined sequence to further prevent large switching current surges.

It is appreciated that circuits and/or sub-circuits may be arranged in different configurations. For example, the ELPG controllers and/or the power gating arbiter may be divided into various functional blocks. In another example, one or more functions of the ELPG controllers may instead be implemented as part of the power gating arbiter or the ELPG controllers' respective engines. It is also appreciated that not all engines in the integrated circuit need be under control of a corresponding ELPG controller. Similarly, not all ELPG controllers in the integrated circuit need be under control of the power gating arbiter.

Operation of the integrated circuit power gating system will be further explained herein with reference to FIGS. 2-5. The operation of the ELPG controllers 125, 130, 135 will be explained with reference to FIGS. 2 and 3. The prioritizing and sequencing of the operation of the ELPG controllers 125, 130, 135 by the power gating arbiter 140 will be explained with reference to FIGS. 4 and 5.

Figure 2:
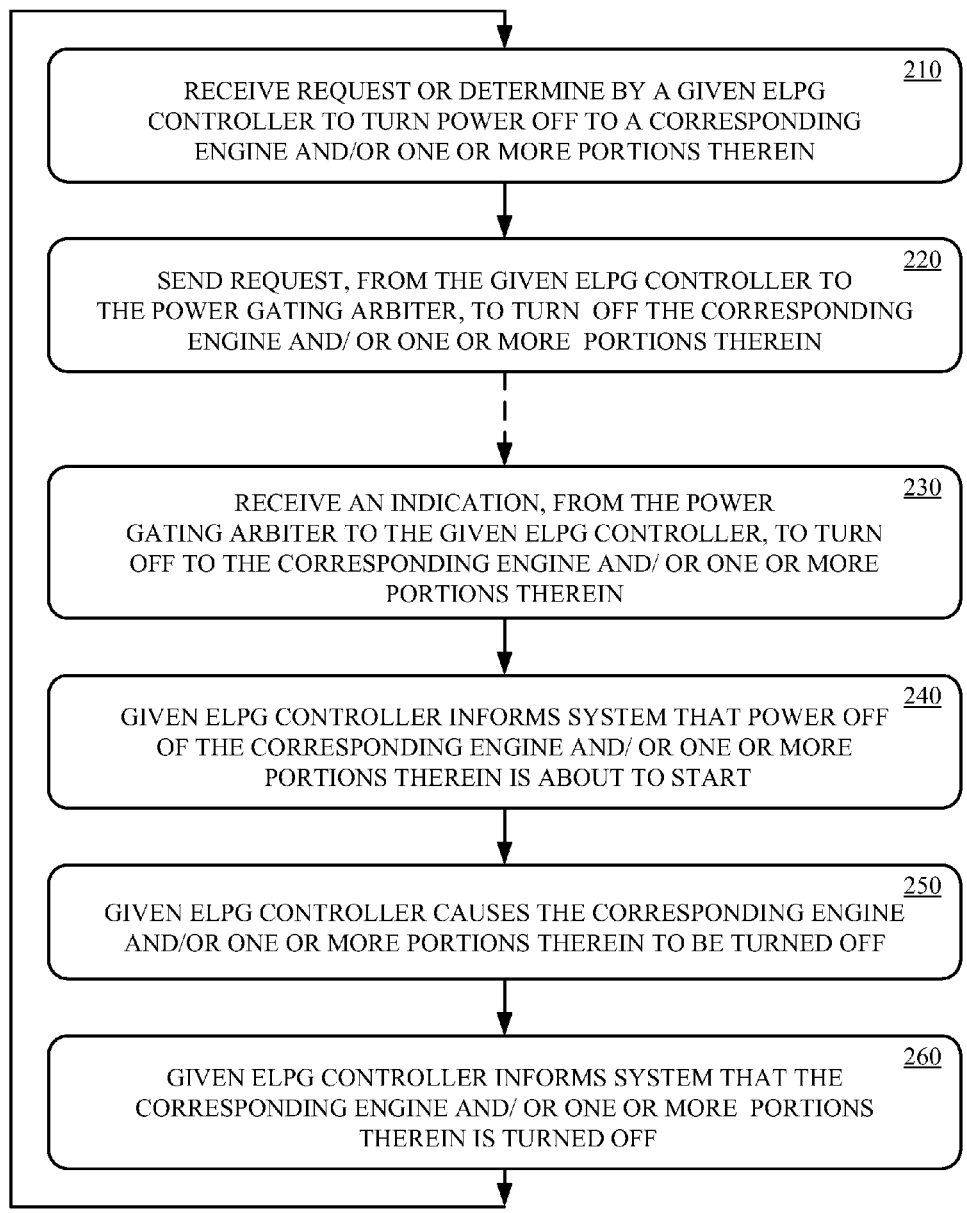
FIG. 2 shows a flow diagram of a method of engine level power gating, in accordance with one embodiment of the present technology.

Referring now to FIG. 2, a method of engine level power gating by an ELPG controller in an integrated circuit, in accordance with a power down embodiment of the present technology, is shown. It is appreciated that the method may be implemented in hardware, software, firmware or any combination thereof within the integrated circuit. In one implementation, the method may be implemented in combinational logic. In another implementation, the method may be implemented as computing device-executable instructions (e.g., computer program) that are stored in computing device-readable media (e.g., computer memory) and executed by a computing device (e.g., microcontroller, arithmetic and logic unit (ALU)). It is also appreciated that the method may include additional processes, that one or more processes may be performed in a different order, that one or more processes may be combined and/or subdivided, and/or that not all processes described herein need be performed to implement the claimed invention.

A given ELPG controller 125 may receive a request to turn off a corresponding engine 110 or one or more portions therein under control of the given ELPG controller 125, at 210. Turning off the corresponding engine 110 or one or more portions therein may include turning off one or more clocks of the engine or one or more portions therein, turning off the power to the corresponding engine or one or more portions therein, turning off one or more supply potentials of the engine or one or more portions therein, or the like. In one implementation, the request to turn off the engine 110 may be received when the idle time of the target engine 110 matches or exceeds a predetermined idle threshold. Alternatively, a given ELPG controller 125 may determine that its respective engine 110 has been idle for a predetermined period of time and therefore the engine should be turned off. In addition, the ELPG controller 125 may check to make sure that a request to use its corresponding engine 110 is not pending when determining if the engine 110 should be turned off. Optionally, a request to turn off the engine may be received and/or determined by the given ELPG controller 125 with respect to one or more portions of the engine 110, such as partitions, zones and/or the like, within the engine. At 220, the given ELPG controller 125 may send a request to the power gating arbiter 140 to turn off its corresponding engine 110 and/or one or more portions therein.

Figure 4:
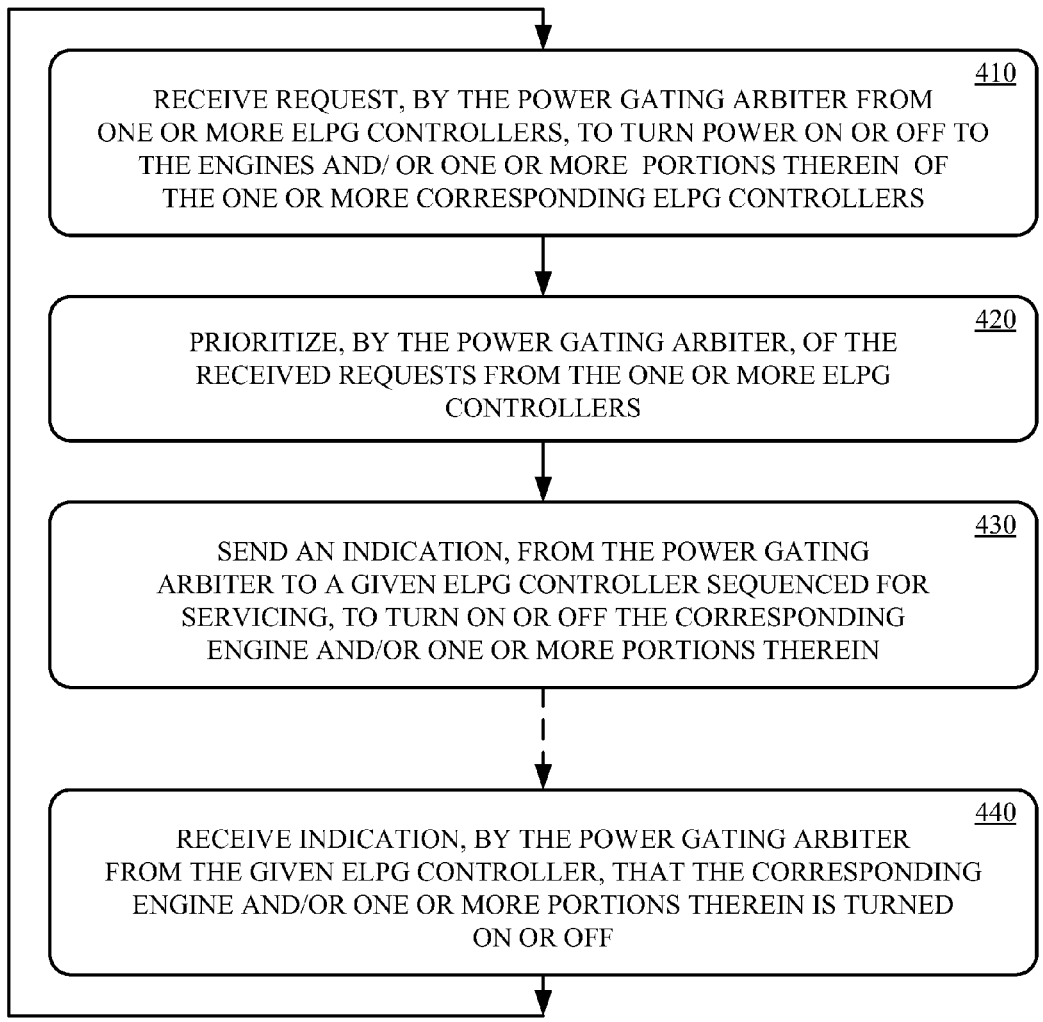
FIG. 4 shows a flow diagram of a method of engine level power gating arbitration, in accordance with one embodiment of the present technology.

Referring now to FIG. 4, a method of engine level power gating by a power gating arbiter in an integrated circuit, in accordance with a power up embodiment of the present technology, is shown. It is appreciated that the method may be implemented in hardware, software, firmware or any combination thereof within the integrated circuit. In one implementation, the method may be implemented in combinational logic. In another implementation, the method may be implemented as computing device-executable instructions (e.g., computer program) that are stored in computing device-readable media (e.g., computer memory) and executed by a computing device (e.g., microcontroller, arithmetic and logic unit (ALU)). It is also appreciated that the method may include additional processes, that one or more processes may be performed in a different order, that one or more processes may be combined and/or subdivided, and/or that not all processes described herein need be performed to implement the claimed invention.

The power gating arbiter 140 receives a request from one or more ELPG controllers 125, 130, 135 to turn on or off each of their corresponding engines 110, 115, 120 and/or one or more portions therein, at 410. In one implementation, a request is received by the power gating arbiter 140 from an ELPG controller 125 when a request control signal line (REQ) between the respective ELPG controller 125 and the power gating arbiter 140 is switched from a first state (e.g., logic level low) to a second state (e.g., logic level high) by the respective ELPG controller 125. One or more ELPG controllers 125, 130, 135 may request to turn on or off its corresponding engine by asserting a respective request control signal (REQ). For example, the power gating arbiter 140 may receive a request (REQA) from ELPG controller A 125 and a request (REQM) from ELPG controller M 135. At 420, the power gating arbiter 140 sequences servicing of the received requests in a predetermined order. At 430, the power gating arbiter 140 sends an indication to the given ELPG controller 125 sequenced for servicing to turn off its corresponding engine and/or one or more portions therein. In one implementation, the power gating arbiter 140 sequences requests from one or more ELPG controllers 125, 135 by switching an acknowledgement signal line (ACK) from a first state (e.g., logic low level) to a second state (e.g., logic high level) in a predetermined sequence. For example, the power gating arbiter 140 may determine that ELPG controller A 125 requesting to turn off its respective engine has the highest priority and should be serviced before ELPG controller M 135. In such case, the acknowledgement signal (ACKA) to ELPG controller A 125 is asserted by the power gating arbiter 140 first, and remains asserted until the ELPG controller A 125 completes turning on its corresponding engine 110 or portions therein.

Referring again to FIG. 2, the given ELPG controller 125 receives an indication from the power gating arbiter 140 to proceed with turning off the ELPG controller's corresponding engine 110 and/or one or more portions therein, at 230. At 240, the given ELPG controller 125 informs the system that powering off of its corresponding engine 110 and/or one or more portions therein is about to start. In response the system may save the context of the corresponding engine and/or hold off data from transferring into the engine 110. At 250, the given ELPG controller 125 causes its corresponding engine 110 and/or one or more portion therein to be turned off. The portions of the engine 110 may be turned off in a predetermined order. In one implementation, the given ELPG controller 125 may cause the output ports of its corresponding engine 110 and/or the one or more portions therein to be clamped to default values. The output ports within the engine 110 may be clamped in a predetermined order. The given ELPG controller 125 may then causes the one or more clocks of its corresponding engine 110 and/or one or more portions therein to be turned off. The clocks within the engine 110 may be turned off in a predetermined order. The given ELPG controller 125 may then causes power to its corresponding engine 110 and/or one or more portions therein to be turned off. The power zones within the engine 110 may be turned off in a predetermined order. At 260, the given ELPG controller 125 informs the system that its corresponding engine 110 and/or one or more portions therein is turned off.

Referring again to FIG. 4, the power gating arbiter 140 receives from the given ELPG controller 125 the indication that the ELPG controller's 125 corresponding engine 110 and/or one or more partitions therein is turned off, at 440. For example, the ELPG controller A 125 may de-assert its respective request control signal (REQ) to indicate that the ELPG controller A 125 has completed turning off its corresponding engine 120 or portions therein. The power gating arbiter 140 may repeat process 410-430 for each request after receiving the indication from the previously serviced ELPG controller that its corresponding engine is turned off. For example, after the ELPG controller A 125 has indicated that it has turned off its corresponding engine 110 or portions therein, the power gating arbiter 140 may determine that ELPG controller M 135 has the next highest priority and should be serviced according to processes 230-260 and 440. In such case, the acknowledgement signal (ACKM) to ELPG controller M 135 is asserted by the power gating arbiter 140 next and remains asserted until the ELPG controller M 135 completes turning off its corresponding engine 110 or portions therein. In addition, one or more other ELPG controllers 130 may initiate a power off process according to processes of 210-260 and 410-440.

Figure 3:
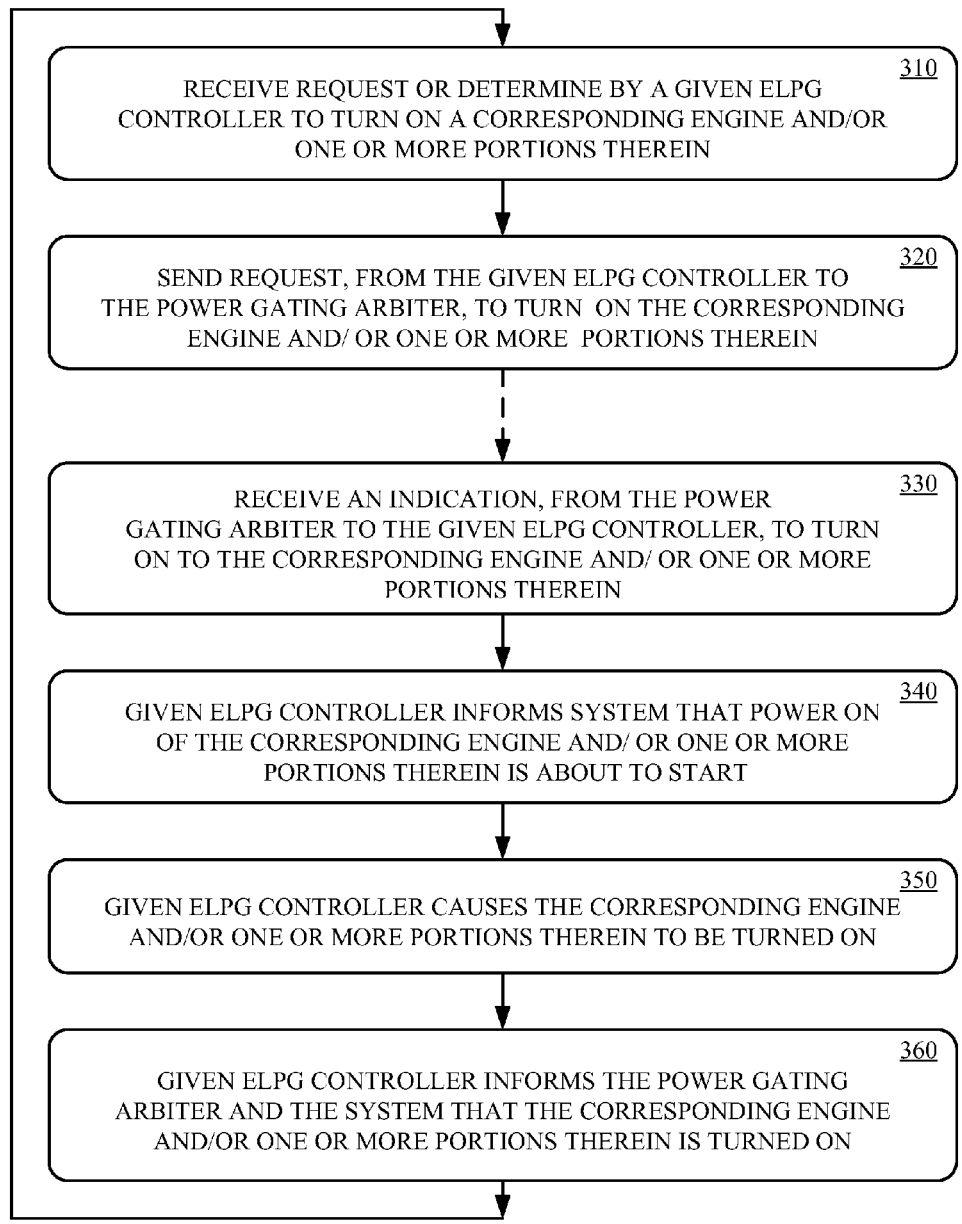
FIG. 3 shows a flow diagram of a method of engine level power gating, in accordance with another embodiment of the present technology.

Referring now to FIG. 3, a method of engine level power gating by an ELPG controller in an integrated circuit, in accordance with a power up embodiment of the present technology, is shown. It is appreciated that the method may be implemented in hardware, software, firmware or any combination thereof within the integrated circuit. In one implementation, the method may be implemented in combinational logic. In another implementation, the method may be implemented as computing device-executable instructions (e.g., computer program) that are stored in computing device-readable media (e.g., computer memory) and executed by a computing device (e.g., microcontroller, arithmetic and logic unit (ALU)). It is also appreciated that the method may include additional processes, that one or more processes may be performed in a different order, that one or more processes may be combined and/or subdivided, and/or that not all processes described herein need be performed to implement the claimed invention.

A given ELPG controller 135 may receive a request to turn power on to a corresponding engine 120 under control of the ELPG controller 135 and/or one or more portions within the engine 120, at 310. At 320, the given ELPG controller 135 sends a request to the power gating arbiter 140 to power on to its corresponding engine 120 and/or one or more portions therein.

Referring again to FIG. 4, the power gating arbiter 140 receives a request from one or more ELPG controllers 125, 130, 135 to turn on or off each of their corresponding engines 110, 115, 120 and/or one or more portions therein, at 410. In one implementation, a request is received by the power gating arbiter 140 from an ELPG controller 125 when a request control signal line (REQ) between the respective ELPG controller 125 and the power gating arbiter 140 is switched from a first state (e.g., logic level low) to a second state (e.g., logic level high) by the respective ELPG controller 125. One or more ELPG controllers 125, 130, 135 may request to turn on or off its corresponding engine by asserting a respective request control signal (REQ). For example, the power gating arbiter 140 may receive request (REQA) from ELPG controller A 125 and a request (REQM) from ELPG controller M 135. At 420, the power gating arbiter 140 sequences servicing of the received requests in a predetermined order. At 430, the power gating arbiter 140 sends an indication to the given ELPG controller 125 sequenced for servicing to turn off its corresponding engine and/or one or more portions therein. In one implementation, the power gating arbiter 140 sequences requests from one or more ELPG controllers 125, 135 by switching an acknowledgement signal line (ACK) from a first state (e.g., logic low level) to a second state (e.g., logic high level) in a predetermined sequence. In another example, the power gating arbiter 140 may determine that ELPG controller M 135 requesting to turn on its respective engine has the highest priority and should be serviced before ELPG controller A 125. In such case, the acknowledgement signal (ACKM) to ELPG controller M 135 is asserted by the power gating arbiter 140 first, and remains asserted until the ELPG controller M 135 completes turning on or off its corresponding engine 120 or portions therein.

Referring again to FIG. 3, the given ELPG controller 135 receives an indication from the power gating arbiter 140 to proceed with turning on the ELPG controller's corresponding engine 120 and/or one or more portions therein, at 330. In one implementation, the given ELPG controller 135 receives an acknowledgement signal (ACK) in the second state asserted by the power gating arbiter 140. At 340, the given ELPG controller 135 informs the system that powering on of its corresponding engine 120 and/or one or more portions therein is about to start. In response the system may restore the context of the corresponding engine 120. At 350, the given ELPG controller 135 causes its corresponding engine and/or one or more portions therein to turn on. In one implementation, the engine and/or one or more portions therein may be turned on in a predetermined sequence that may vary for each individual engine and/or portions therein, or for groups of engines and/or portions therein. In one implementation, the ELPG controller 135 may cause the clocks of the engine 120 and/or one or more portions therein to turn on, the state of the engine 120 and/or one or more portions therein to be reset or restored, the clamping of the output ports of the engine 120 and/or one or more portions therein to be disabled, the holding of system data of the engine 120 and/or one or more portions therein to be released, and/or the like. At 360, the given ELPG controller 135 informs the power gating arbiter 140 and the system that its corresponding engine 120 and/or one or more portions therein is turned on. In one implementation, the given ELPG controller 135 de-asserts is respective request control signal (REQ) to indicate that the ELPG controller 135 has completed turn on its corresponding engine 120 or portions therein.

Referring again to FIG. 4, the power gating arbiter 140 receives from the given ELPG controller 135 the indication that the ELPG controller's 135 corresponding engine 120 and/or one or more partitions therein is turned on, at 440. For example, the ELPG controller M 135 may de-assert its respective request control signal (REQ) to indicate that the ELPG controller M 135 has completed turning on its corresponding engine 120 or portions therein. The power gating arbiter 140 may repeat process 410-430 for each request after receiving the indication from the previously serviced ELPG controller that its corresponding engine is turned on. For example, after the ELPG controller M 135 has indicated that it has turned on its corresponding engine 120 or portions therein, the power gating arbiter 140 may determine that ELPG controller A 125 has the next highest priority and should be serviced according to processes 330-350 and 440. In such case, the acknowledgement signal (ACKA) to ELPG controller A 125 is asserted by the power gating arbiter 140 next and remains asserted until the ELPG controller A 125 completes turning on its corresponding engine 110 or portions therein. In addition, one or more other ELPG controllers 130 may initiate a power on process according to processes of 310-360 and 410-440.

Figure 5:
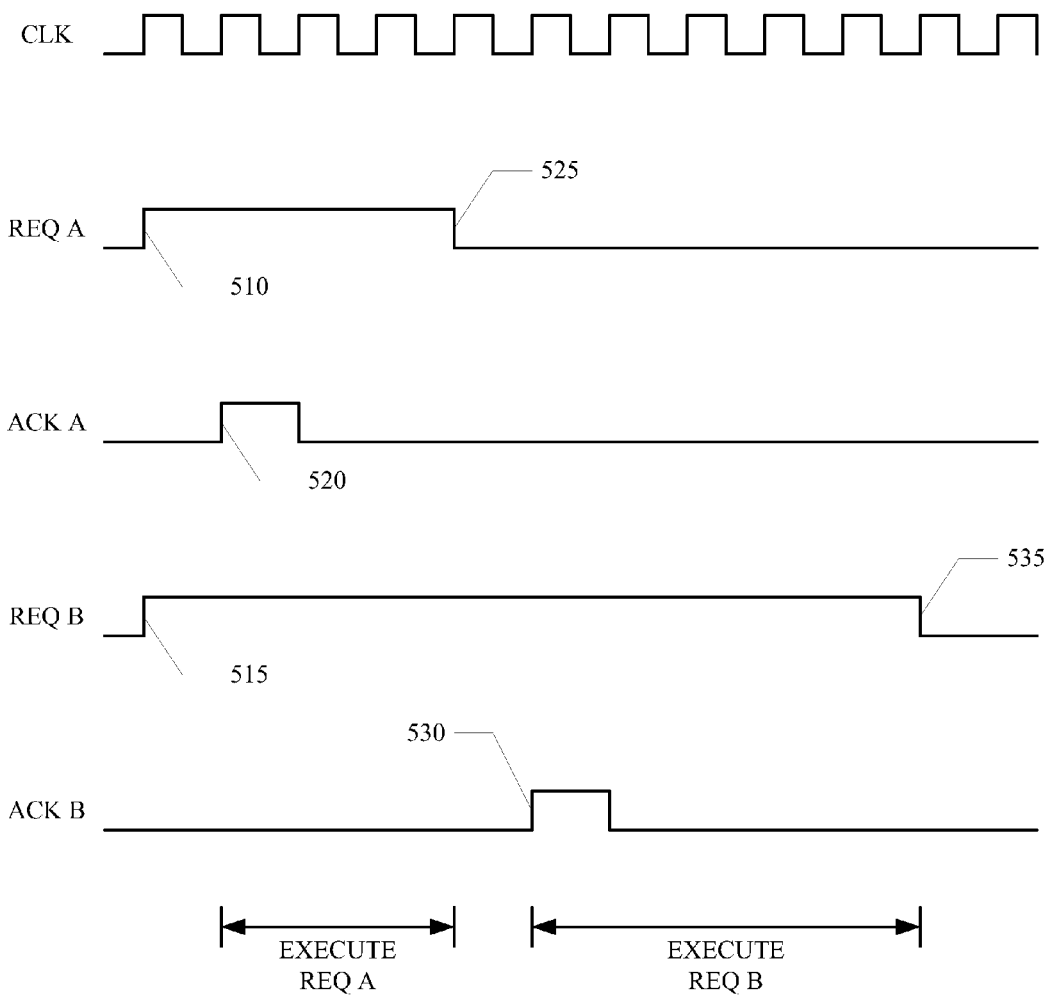
FIG. 5 shows a control signal timing diagram illustrating an exemplary engine level power gating arbitration, in accordance with one embodiment of the present technology.

Referring now to FIG. 5, a control signal timing diagram illustrating an exemplary engine level power gating arbitration, in accordance with one embodiment of the present technology, is shown. In one implementation, the request control signals (REQ) driven by the ELPG controllers 125, 130 and the acknowledgement control signals (ACK) driven by the power gating arbiter 140 are a logic "0" by default. As illustrated, ELPG controllers A and B 125, 130 assert (e.g., logic "1") their respective request signals (REQA, REQB) 510, 515 substantially simultaneously. If the power gating arbiter 140 has a power switching sequence pending for another ELPG controller, the power gating arbiter 140 queues the requests from the ELPG controllers A and B 125, 130 until the current pending sequence is completed. When any previously pending request is completed, the power gating arbiter 140 may determine that ELPG controller A 125 has the highest priority and should be serviced before ELPG controller B 130. In such case, the acknowledgement signal (ACKA) to ELPG controller A 125 is asserted 520 by the power gating arbiter 140 first. The request signal (REQA) from the ELPG controller A 125 remains asserted until 525 the ELPG controller A 125 completes turning on its corresponding engine 110 or portions therein. After the pending request from ELPG controller A 125 is completed, the power gating arbiter 140 may determine that ELPG controller B 130 can be serviced. In such case, the acknowledgement signal (ACKB) 530 to ELPG controller B 130 is asserted by the power gating arbiter 140. The request signal (REQB) 515 from the ELPG controller B remains asserted until 535 the ELPG controller B 135 completes powering on its corresponding engine 115 or portions therein.

Figure 6A:
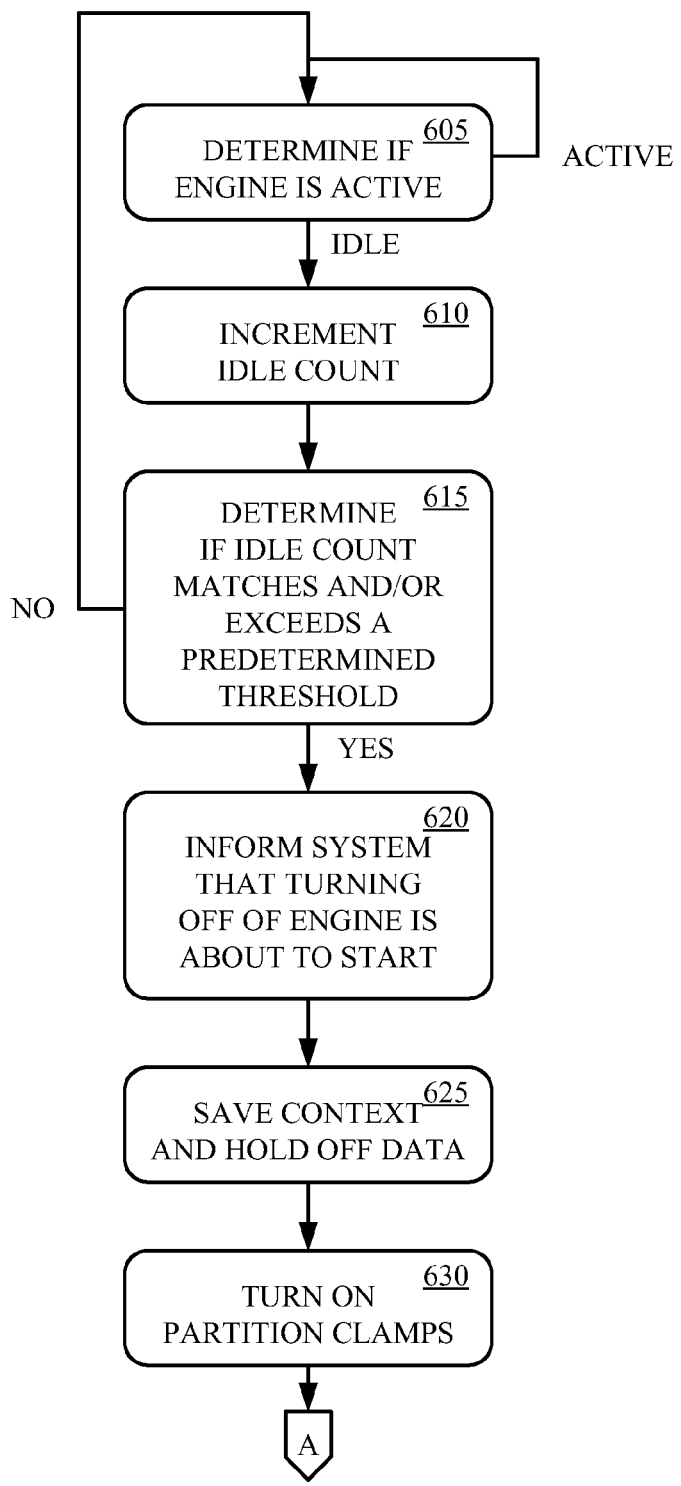
FIGS. 6A and 6B show a flow diagram of a method of engine level power gating, in accordance with another embodiment of the present technology.
Figure 6B:
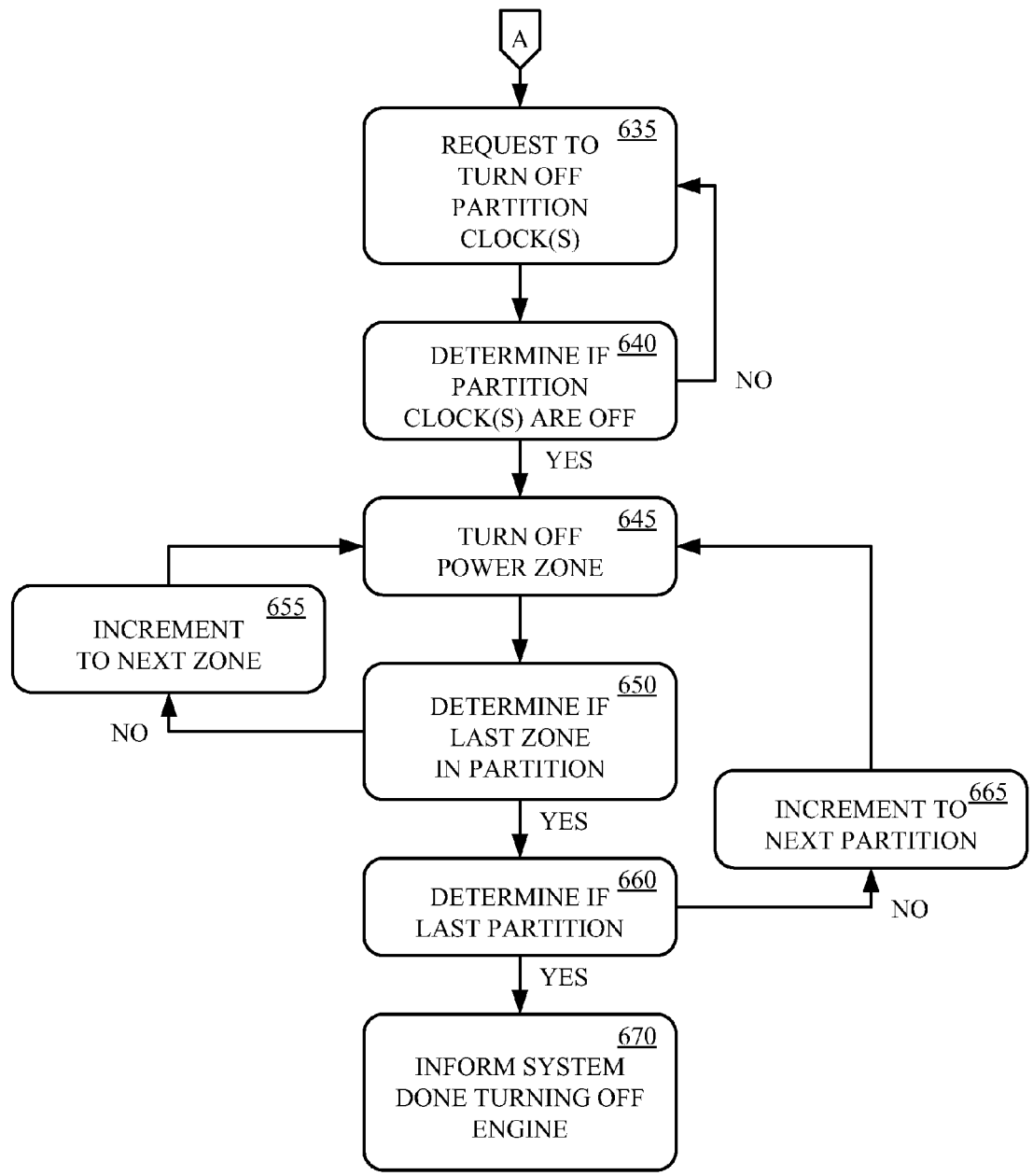

Referring now to FIGS. 6A and 6B, a method of engine level power gating, in accordance with a power down embodiment of the present technology, is shown. It is appreciated that the method may be implemented in hardware, software, firmware or any combination thereof within an integrated circuit. In one implementation, the method may be implemented in combinational logic. In another implementation, the method may be implemented as computing device-executable instructions (e.g., computer program) that are stored in computing device-readable media (e.g., computer memory) and executed by a computing device (e.g., microcontroller, arithmetic and logic unit (ALU)). It is also appreciated that the method may include additional processes, that one or more processes may be performed in a different order, that one or more processes may be combined and/or subdivided, and/or that not all processes described herein need be performed to implement the claimed invention.

The process may begin with a given ELPG controller 125, 130, 135 checking if its corresponding engine 110, 115, 120 or one or more portions of the engine is active, at 605. If the engine is active, the ELPG controller 125, 130, 135 iteratively performs process 605 to check if the engine is active. At 610, if the engine or one or more portions therein is idle, an idle count may be incremented by the ELPG controller. If the engine or one or more portions therein is idle, the ELPG controller determines if the idle count matches or exceeds a predetermined threshold, at 615. If the idle count does not match or exceed the threshold, the ELPG controller returns to process 605. If the idle count matches or exceeds the threshold, the ELPG controller may inform the system that turning off of its corresponding engine and/or one or more portions therein is about to start, at 620. At 630, the ELPG controller may cause the context of its corresponding engine and/or one or more portions therein to be saved and/or data to its corresponding engine and/or one or more portions therein to be held off. At 630, the ELPG controller may cause the output ports of its corresponding engine and/or the one or more portions therein to be clamped to default values.

Referring now to FIG. 6B, the ELPG controller may then request that one or more clocks of its corresponding engine and/or one or more portions therein to be turned off, at 635. The clocks in one or more partitions may be turned off in a predetermined order. At 640, the ELPG controller determines if the one or more clocks are turned off. If the one or more clocks have not been turned off yet, the ELPG controller returns to process 635. If the one or more clocks have been turned off, the ELPG controller may then cause power to its corresponding engine and/or one or more portions therein to be turned off. In one implementation the partitions may be divided into a plurality of zones, which may be turned off in a predetermined order. In such an implementation, the ELPG controller may start with turning power off to a zone in a partition, at 645. At 650, the ELPG controller determines if the current zone at process 645 is the last zone in the partition. If the current zone is not the last zone in the partition, the ELPG controller increments to the next zone, at 655, and returns to process 645. If the current zone is the last zone in the partition, the ELPG controller determines if the current partition at process 645 is the last partition, at 660. IF the current partition is not the last partition in the group, the ELPG controller increments to the next partition, at 665, and returns to process 645. If the current partition is the last partition, the ELPG controller informs the system that the corresponding engine and/or one or more portions therein is turned off, at 670.

Figure 7A:
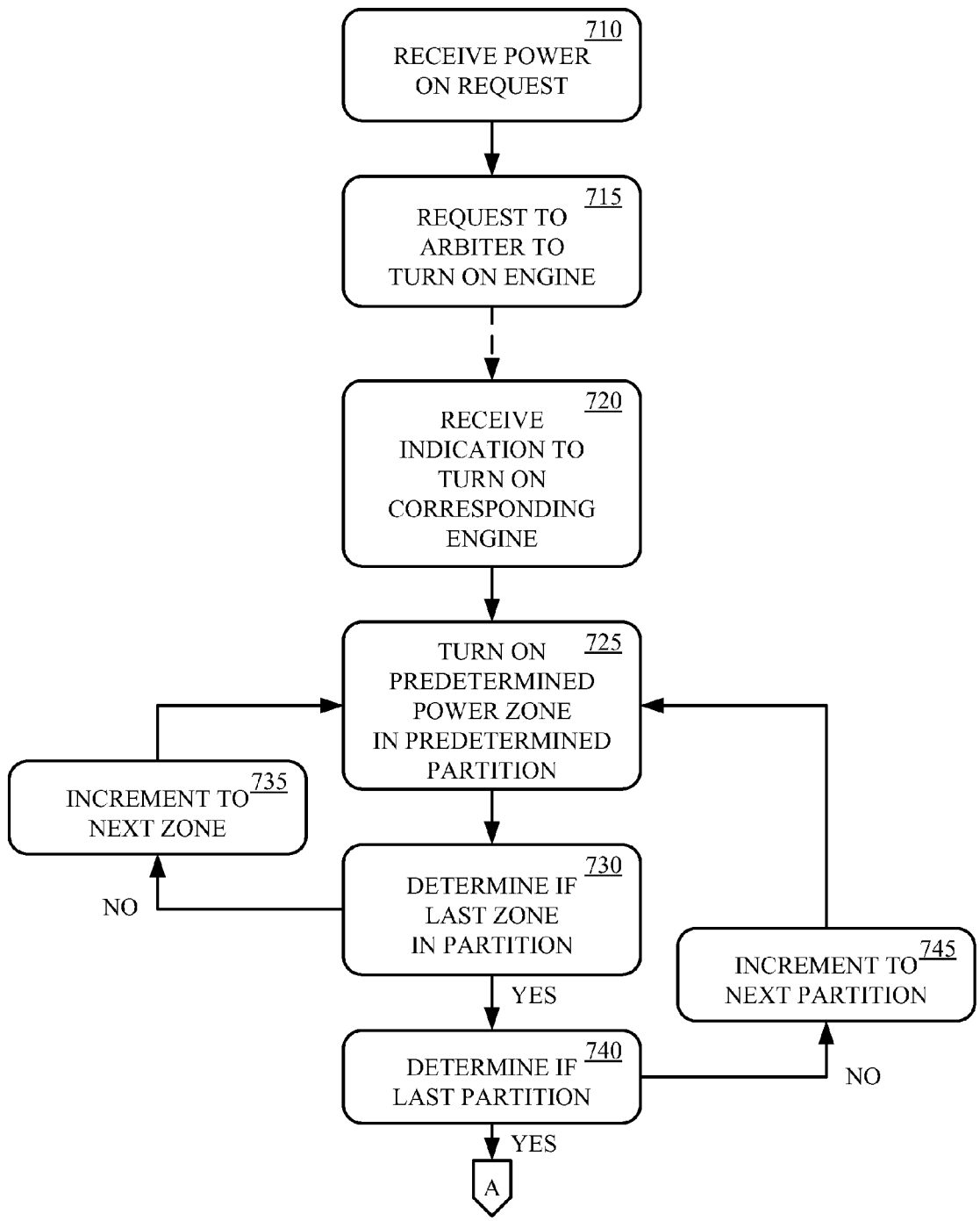
FIGS. 7A and 7B show a flow diagram of a method of engine level power gating, in accordance with another embodiment of the present technology.
Figure 7B:
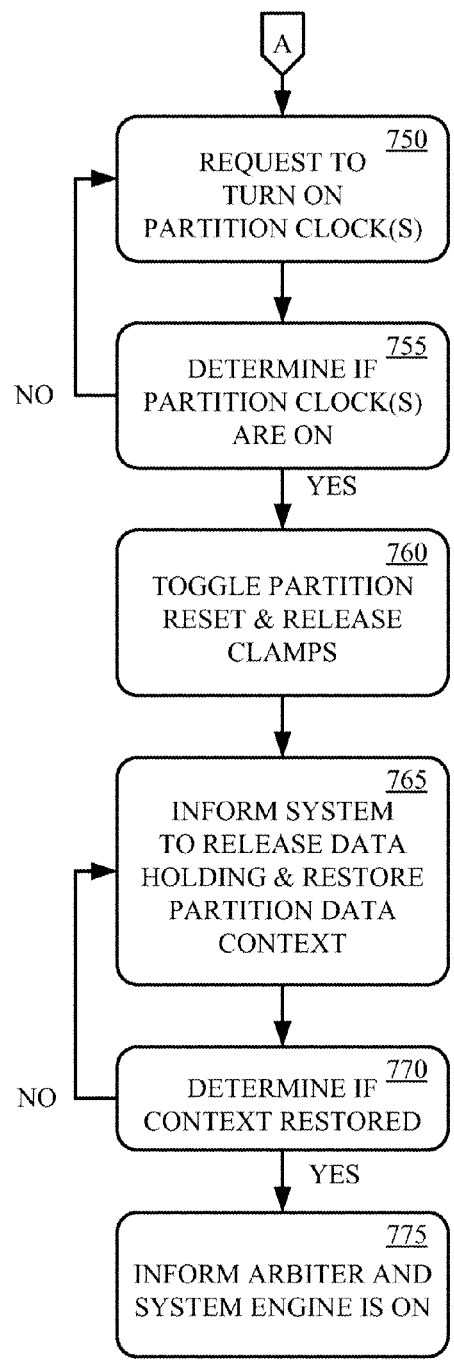

Referring now to FIGS. 7A and 7B, a method of engine level power gating by an ELPG controller, in accordance with a power up embodiment of the present technology, is shown. It is appreciated that the method may be implemented in hardware, software, firmware or any combination thereof within an integrated circuit. In one implementation, the method may be implemented in combinational logic. In another implementation, the method may be implemented as computing device-executable instructions (e.g., computer program) that are stored in computing device-readable media (e.g., computer memory) and executed by a computing device (e.g., microcontroller, arithmetic and logic unit (ALU)). It is also appreciated that the method may include additional processes, that one or more processes may be performed in a different order, that one or more processes may be combined and/or subdivided, and/or that not all processes described herein need be performed to implement the claimed invention.

A given ELPG controller may receive a request to turn on its corresponding engine and/or one or more portions within the engine, at 710. In one implementation, the ELPG controller may receive a request from system software. At 715, the given ELPG controller sends a request to the power gating arbiter to power on to its corresponding engine and/or one or more portions therein. In one implementation, the ELPG controller drives a corresponding request control signal (REQ) to request powering on its corresponding engine and/or one or more portions therein.

Figure 8:
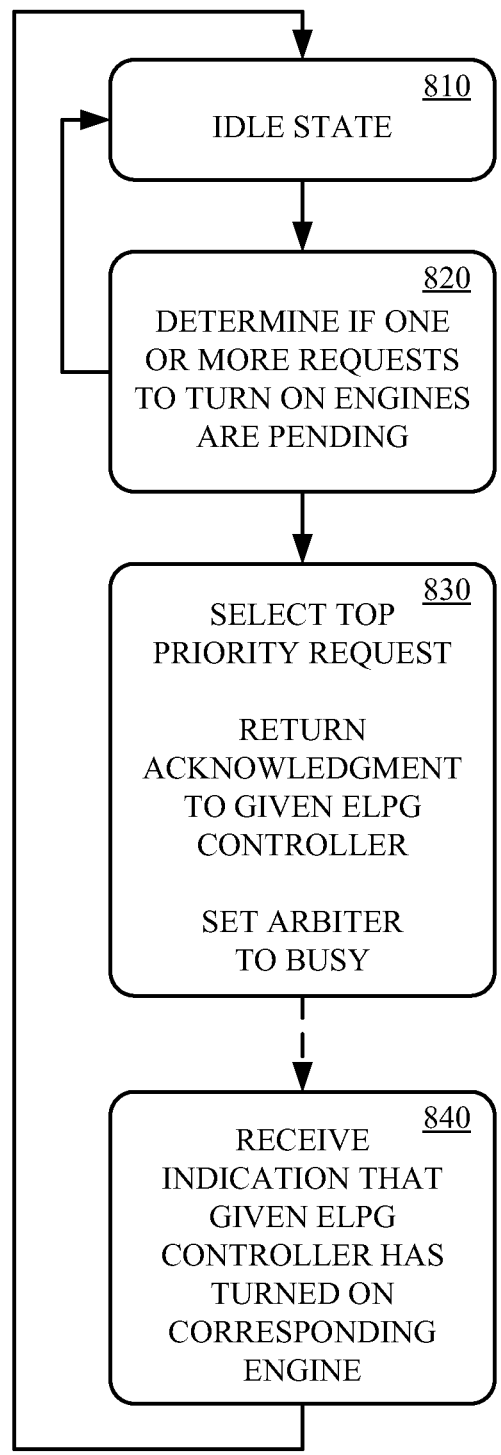
FIG. 8 shows a flow diagram of a method of engine level power gating arbitration, in accordance with another embodiment of the present technology.

Referring now to FIG. 8, a method of engine level power gating by a power gating arbiter, in accordance with a power up embodiment of the present technology, is shown. It is appreciated that the method may be implemented in hardware, software, firmware or any combination thereof within an integrated circuit. In one implementation, the method may be implemented in combinational logic. In another implementation, the method may be implemented as computing device-executable instructions (e.g., computer program) that are stored in computing device-readable media (e.g., computer memory) and executed by a computing device (e.g., microcontroller, arithmetic and logic unit (ALU)). It is also appreciated that the method may include additional processes, that one or more processes may be performed in a different order, that one or more processes may be combined and/or subdivided, and/or that not all processes described herein need be performed to implement the claimed invention.

The power gating arbiter may begin in an idle state at 810. At 820, the power gating arbiter determines if there are one or more requests pending from one or more ELPG controllers to turn power on or off to each of their respective engines and/or one or more portions therein. In one implementation, the power gating arbiter receives a request control signal indicating a request from each of the one or more ELPG controllers to power on their corresponding engine and/or one or more portions therein. For example, the power gating arbiter may receive request (REQA) from ELPG controller A and a request (REQM) from ELPG controller M. If a request is not received, the power gating arbiter returns to process 810. If one or more requests are received, the power gating arbiter sequences servicing of the received requests in a predetermined order, at 820. In one implementation, the power gating arbiter sequences requests from one or more ELPG controllers by driving a selected acknowledgement signal line (ACK) of a given ELPG controller to indicate to the given ELPG controller to proceed with powering on or off its corresponding engine and/or one or more portions therein. For example, the power gating arbiter may determine that ELPG controller M has the highest priority and should be serviced before ELPG controller A. In such case, the acknowledgement signal (ACKM) to ELPG controller M is asserted by the power gating arbiter first and remains asserted until the ELPG controller M completes powering on its respective engine or portions therein. Optionally, the power gating arbiter may drive an arbiter busy signal to indicate to the other ELPG controllers requesting to power on or off their corresponding engine and/or one or more portions therein that the must wait.

Referring again to FIG. 7A, the given ELPG controller receives an indication from the power gating arbiter to proceed with powering on the ELPG controller's corresponding engine and/or one or more portions therein, at 720. In one implementation, the given ELPG controller receives an acknowledgement signal (ACK) to indicate to that the given ELPG controller to proceed with powering on its corresponding engine and/or one or more portions therein. At 725, the given ELPG controller causes power to be turned on to a predetermined power zone within a predetermined partition. At 730, the given ELPG controller determines if the power zone turned on at process 725 is the last zone in the partition. If the zone is not the last zone in the partition, the ELPG controller increments to the next zone, at 735, and repeats process 725-735 until each zone in the partition of the ELPG controller's corresponding engine is turned on in a predetermined order. If the zone is the last zone in the partition, the ELPG controller determines if the partition turned on at processes 725-735 is the last partition, at 740. If the partition is not the last partition, the ELPG controller increments to the next partition, at 745, and repeats process 725-745 until each zone in each partition of the ELPG controller's corresponding engine is turned on in a predetermined order.

Referring now to FIG. 7B, if the partition is the last partition, the ELPG controller causes the clocks of a predetermined partition to be turned on, at 750. At 755, the given ELPG controller determines if the partition in which the clocks are turned on at process 750 is the last partition in the engine. If the partition is not the last partition, the ELPG controller repeats process 750-755 until the clocks of each partition of the ELPG controller's corresponding engine is turned on in a predetermined order. At 760, the given ELPG controller causes each partition to be reset and the output clamps to be released in its corresponding engine. At 765, the given ELPG controller informs the system to release one or more data holds and restore data context for its corresponding engine. At 770, the given ELPG controller determines if the context for its corresponding engine has been restored. If the context has not been restored, the given ELPG controller returns to process 770. If the context has been restored, the given ELPG controller informs the power gating arbiter and the system that the its corresponding engine and/or one or more portions therein is turned on, at 775. In one implementation, the given ELPG controller informs the power gating arbiter that its engine or portions therein is turned on by de-assert its respective request control signal (REQ).

Referring again to FIG. 8, the power gating arbiter receives from the given ELPG controller the respective request signal indicating that turning on of the corresponding engine and/or one or more portions therein has been completed, at 840. The power gating arbiter may repeat process 810-840 for each request.

The engine level power gating techniques, in accordance with embodiments of the present technology, advantageously reduce power consumption on integrated circuits by selectively switching power on or off to one or more engines and/or portions therein. Embodiments also advantageous control switching current surges by selectively switching power on or off to one or more engines and/or portions therein in a predetermined order.

The foregoing descriptions of specific embodiments of the present technology have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is intended that the scope of the invention be defined by the claims appended hereto and their equivalents.

What is claimed is:

1. A method comprising:
receiving a request, by a power gating arbiter of an integrated circuit from one or more engine level power gating controllers of the integrated circuit, to turn on or off a corresponding engine of the one or more engine level power gating controllers;
sequencing, by the power gating arbiter, the received requests from the one or more engine level power gating controllers for servicing in a predetermined order, wherein sequencing the received requests includes;
prioritizing, by the power gating arbiter, the received requests from the one or more engine level power gating controllers;
sending an indication, from the power gating arbiter to a given engine level power gating controller, to turn on or off the corresponding engine of the given engine level power gating controller according to the prioritizing;
receiving, an indication, by the power gating arbiter from the given engine level power gating controller by changing a state of the respective request signal from the given engine level power gating controller, that the corresponding engine of the given engine level power gating controller is turned on or off; and
iteratively prioritizing the received requests, sending the indication to turn on or off the corresponding engine, and receiving the indication that the corresponding engine has completed power on or off, for each received request after receiving the indication from the previously serviced engine level power gating controller that its corresponding engine is turned on or off;
causing, by the given engine level power gating controller, the corresponding engine of the given engine level power gating controller to turn on or off in a predetermined sequence after receiving the indication to turn on or of the corresponding engine;
determining, by the given engine level power gating controller, that the corresponding engine of the given engine level power gating controller is idle for at least a predetermined threshold;
receiving a request, by the power gating arbiter from one or more engine level power gating controllers of the integrated circuit, to turn off the corresponding engine of the one or more engine level power gating controllers if the corresponding engine is idle for at least the predetermined threshold;
sequencing, by the power gating arbiter, the received requests from the one or more engine level power gating controllers to turn off the corresponding engine for servicing in the predetermined order;
sending, according to the sequencing of the received turn off requests, an indication, from the power gating arbiter to the given engine level power gating controller, to turn off the corresponding engine of the given engine level power gating controller; and
causing, by the given engine level power gating controller, the corresponding engine of the given engine level power gating controller to turn off in the predetermined, sequence.

2. The method according to claim 1, wherein receiving the request to turn off the corresponding engine of the one or more engine level power gating controllers comprises asserting a respective request signal from each of the one or more engine level power gating controllers.

3. The method according to claim 1, wherein sending the indication to turn off the corresponding engine of the given engine level power gating controller comprises asserting a respective acknowledgement signal to the given engine level power gating controller.

4. The method according to claim 1, further comprising receiving an indication, by the power gating arbiter from the given engine level power gating controller, that the corresponding engine of the given engine level power gating controller is turned off.

5. The method according to claim 4, wherein receiving the indication that the corresponding engine is turned of comprises de-asserting the respective request signal from the given engine level power gating controller.

6. The method according to claim 1, further comprising:
   receiving a request, by the power gating arbiter of the integrated circuit from one or more engine level power gating controllers of the integrated circuit, to turn on a corresponding engine of the one or more engine level, power gating controllers; and
   sequencing, by the power gating arbiter, the received turn on requests from the one or more engine level power gating controllers for servicing.

7. The method according to claim 6, wherein said sequencing the received turn on requests for servicing comprises:
   prioritizing, by the power gating arbiter, the received requests from the one or more engine level power gating controllers;
   sending an indication, from the power gating arbiter to a given engine level power gating controller, to turn on the corresponding engine of the given engine level power gating controller according to the prioritizing;
   receiving an indication, by the power gating arbiter from the given engine level power gating controller, that the corresponding engine of the given engine level power gating controller is turned on; and
   iteratively prioritizing the received requests, sending the indication to turn on the corresponding, engine, and receiving the indication that the corresponding engine has completed power on, for each received request after receiving the indication from the previously serviced engine level power gating controller that its corresponding engine is turned on.

8. A method comprising:
   determining, by a power gating arbiter, if one or more requests to turn on or off a corresponding engine of one or more engine level power gating controllers are pending;
   prioritizing, by the power gating arbiter, an order for servicing the received requests from the one or more engine level power gating controllers;
   sending an indication, from the power gating arbiter to a given engine level power gating controller, to turn on or off the corresponding engine of the given engine level power gating controller according to the prioritized order;
   turning on, by the given engine level power gating controller, one or more power zones of one or more partitions of the corresponding engine of the given engine level power gating controller in a predetermined sequence after receiving the indication to turn on the corresponding engine;
   turning on, by the given engine level power gating controller, one or more clocks of the corresponding engine of the given engine level power gating controller after receiving the indication to turn on the corresponding engine;
   toggling a reset and releasing one or more output damps, by the given engine level power gating controller, of the one or more partitions of the corresponding engine of the given engine level power gating controller after receiving the indication to turn on the corresponding engine;
   releasing a data hold and restoring a context, by the given engine level power gating controller, for the corresponding engine of the given engine level power gating controller after receiving the indication to turn on the corresponding engine;
   receiving an indication, by the power gating arbiter from the given engine level power gating controller, that the corresponding engine of the given engine level power gating controller is turned on or off; and
   iteratively prioritizing the order for servicing the received requests, sending the indication to turn on or of the corresponding engine, and receiving the indication that the corresponding engine is turned on or off, for each received request.

9. The method according to claim 8, wherein receiving the requests to turn on or off the corresponding engine of the one or more engine level power gating controllers comprises receiving a respective request signal in a first state from each of the one or more engine level power gating controllers.

10. The method according to claim 9, wherein sending, the indication to turn on or off the corresponding engine of the given engine level power gating controller comprises sending a respective acknowledgement signal in a first state to the given engine level power gating controller.

11. The method according to claim 10, wherein receiving, the indication that the corresponding engine is turned on comprises receiving a transition of the respective request signal from the first state to as second state from the given engine level power gating controller.

12. The method according to claim 8, further comprising:
   determining, by the given engine level power gating controller, that the corresponding engine of the given level power gating controller is idle for at least a predetermined threshold;
   turning on, by the given engine level power gating controller, the one or more output clamps of the one or more partitions of the corresponding engine of the given engine level power gating controller if the corresponding engine is idle for at least the predetermined threshold;
   turning off, by the given engine level power gating controller, one or more clocks of the corresponding engine of the given engine level power gating controller if the corresponding engine is idle for at least the predetermined threshold; and
   turning off, by the given engine level power gating controller, one or more power zones of one or more partitions of the corresponding engine of the given engine level power gating controller in a predetermined sequence if the corresponding engine is idle for at least the predetermined threshold.

13. An integrated circuit comprising:
   a plurality of engines;
   a plurality of engine level power gating controllers, wherein each engine level power gating controller dynamically controls power switching of a corresponding engine by turning on and off its corresponding engine in a corresponding predetermined order;

a power gating arbiter to dynamically sequence control of power switching by the plurality of engine level power gating controllers;

a respective request signal communicatively coupled between the power gating arbiter and each of the plurality of engine level power gating controllers, wherein a given engine level power gating controller drives its respective request signal to a first state to request to turn on or off the corresponding engine of the given engine level power gating controller;

a respective acknowledgement signal communicatively coupled between the power gating arbiter and each of the plurality of engine level power gating controllers, wherein the power gating arbiter drives the respective acknowledgement signal of the given engine level power gating controller to a first state, in response to the request, to turn on or off the corresponding engine of the given engine level power gating, controller according, to a predetermined power control sequence for the plurality of engines;

wherein the given engine level power gating controller drives its respective request signal from the first state to a second state to indicate that the corresponding engine of the given engine level power gating controller is turned on or off after its respective acknowledgement signal is driven to the first state; and wherein the given engine level power gating controller turns on or off each of one or more power zones of its corresponding engine in a predetermined order in response to its respective acknowledgment signal in the first state.

14. The integrated circuit of claim 13, wherein the given engine level power gating controller turns clocks on or off in its corresponding engine in response to its respective acknowledgement signal in the first state.

15. The integrated circuit of claim 13, wherein the given engine level power gating controller releases output clamps or unclamps in its corresponding engine in response to its respective acknowledgement signal in the first state.

16. The integrated circuit of claim 13, wherein the given engine level power gating controller restores or saves a context of its corresponding engine M response to its respective acknowledgement signal in the first state.

* * * * *